United States Patent [19]
Toyoda et al.

[11] Patent Number: 5,198,913
[45] Date of Patent: Mar. 30, 1993

[54] APPARATUS FOR DISPLAYING THREE-DIMENSIONAL IMAGE BY USING POCKELS READOUT OPTICAL MODULATOR

[75] Inventors: Shuhei Toyoda; Yukihisa Osugi, both of Nagoya, Japan

[73] Assignee: NGK, Insulators, Ltd., Japan

[21] Appl. No.: 840,089

[22] Filed: Feb. 24, 1992

[30] Foreign Application Priority Data

Mar. 1, 1991 [JP] Japan ................................. 3-57624

[51] Int. Cl.⁵ .............................................. G03H 1/08
[52] U.S. Cl. ............................................ 359/7; 359/9; 359/1
[58] Field of Search ............................ 359/1, 3, 4, 7, 9

[56] References Cited

U.S. PATENT DOCUMENTS

| | | | |
|---|---|---|---|
| 3,542,452 | 10/1970 | Gerritson et al. | 359/4 |
| 4,669,812 | 6/1987 | Hoebing | 359/9 |
| 4,701,006 | 10/1987 | Perlmutter | 359/9 |
| 5,029,221 | 7/1991 | Takiguchi et al. | 250/370.08 |

FOREIGN PATENT DOCUMENTS 55-60980  5/1980  Japan .

OTHER PUBLICATIONS

"Practical Technique for Holography", M. Suzuki, Publisher Optonics Co., Ltd., Apr. 1, 1988.

Primary Examiner—Bruce Y. Arnold
Assistant Examiner—J. P. Ryan
Attorney, Agent, or Firm—Parkhurst, Wendel & Rossi

[57] ABSTRACT

An apparatus for displaying a three-dimensional image of a plurality of tomographic images by storing pictorial information of a tomographic image in an image converting element, forming interference fringes between a reading light beam which is transmitted through the image converting element and is modulated in accordance with the pictorial information stored therein and a reference light beam, and recording the interference fringes on a photographic plate. A three-dimensional image is reproduced by projecting the reference light beam onto the thus developed photographic plate. The image converting element is formed by a Pockels readout optical modulator. An intensity and position of a coherent light beam is modulated in accordance with the pictorial information of the tomographic image, and the thus modulated coherent reading light beam is made incident upon the Pockels readout optical modulator.

11 Claims, 2 Drawing Sheets

| $I_{11};x_1,y_1$ | $I_{21};x_2,y_1$ | $I_{31};x_3,y_1$ | | | $I_{n1};x_n,y_1$ |
|---|---|---|---|---|---|
| $I_{12};x_1,y_2$ | $I_{22};x_2,y_2$ | $I_{32};x_3,y_2$ | | | $I_{n2};x_n,y_2$ |
| $I_{13};x_1,y_3$ | $I_{23};x_2,y_3$ | $I_{33};x_3,y_3$ | | | $I_{n3};x_n,y_3$ |
| $I_{14};x_1,y_4$ | $I_{24};x_2,y_4$ | $I_{34};x_3,y_4$ | | | $I_{n4};x_n,y_4$ |
| | | | | | |
| $I_{1m};x_1,y_m$ | $I_{2m};x_2,y_m$ | $I_{3m};x_3,y_m$ | | | $I_{nm};x_n,y_m$ |

APPARATUS FOR DISPLAYING THREE-DIMENSIONAL IMAGE BY USING POCKELS READOUT OPTICAL MODULATOR

BACKGROUND OF THE INVENTION

1. Field of the Invention

The present invention relates to an apparatus for displaying a three-dimensional image of tomographic or sectional images such as X-ray CT (computer tomographic) images, positron CT images, ultrasonic tomographic device and NMR (nuclear magnetic resonance) images.

2. Description of the Related Art Statement

In the field of medical engineering, there has been developed a technique for sensing information within cavities of human beings with the aid of X-ray and $^1$H NMR and the thus sensed tomographic images are displayed three-dimensionally. In Japanese Patent Application Laid-open Publication Kokai Sho 55-60980, there is described an apparatus for displaying tomographic images as a three-dimensional image, in which a tomographic image of an object under inspection cut along a given sectional plane is displayed on a CRT display screen and the displayed image is projected onto an image converting element and is stored therein. Then, a light ray transmitted through the image converting element and a reference light ray are mixed to produce interference fringes, and an image of the thus formed interference fringes are recorded on a photographic plate which is situated at a given photographic plane related to the given sectional plane in which the relevant tomographic image is taken. Such an operation is repeatedly performed for successive tomographic images while the photographic plate is indexed in given photographic planes, and tomographic images are recorded in the photographic plate in a multiple exposed manner. After developing the photographic plate to form a hologram of multiple exposed tomographic images, a three-dimensional image of the object can be reproduced by projecting the reference light beam onto the hologram.

The image converting element is formed by a single crystal such as $Bi_{12}Si_{20}O$ having an electro-optical effect and a wavelength-dependent photoconductivity effect, in which refractive index at a portion of the crystal which is irradiated by light having a given wavelength is locally reduced. In this known three-dimensional image displaying apparatus, the write-in, readout and erase of images can be performed with the aid of the single image converting element, so that the hologram can be obtained within a rather short time.

Recently there has been developed a Pockels readout optical modulator (PROM) which can store image data and comprises a bismuth silicon oxide single crystal plate having parylene insulating films applied on respective surfaces of the single crystal plate and transparent electrodes each applied on respective parylene insulating films. However, no one has proposed to utilize such PROM as a memory element for effecting a three-dimensional display of tomographic images. The inventors of the instant application have conducted various experiments in which the above mentioned PROM is utilized as the image converting element of the known three-dimensional image displaying apparatus. As the result thereof, the inventors have found that it is difficult to display a three-dimensional image having a high resolution. This is mainly due to the fact that the intensity, contrast and resolution of the image displayed on the CRT screen are very low.

SUMMARY OF THE INVENTION

The present invention has for its object to provide a novel and useful apparatus for displaying a sharp three-dimensional image of tomographic images having a high resolution.

According to the invention, an apparatus for displaying a three-dimensional image of tomographic images comprises:

a tomographic image producing means for producing pictorial information representing tomographic images of an object under inspection, said tomographic images being taken on a plurality of predetermined sectional planes of the object;

a first light source for emitting a first coherent light beam;

a modulating means for modulating an intensity and a position of said first coherent light beam in accordance with said pictorial information of tomographic images to produce a coherent writing light beam whose intensity and position are modulated in accordance with said pictorial information of tomographic images;

a first optical means for introducing said coherent writing light beam to an image storing plane;

an image information writing-reading means including a Pockels readout optical modulator which is arranged in said image storing plane and writes said pictorial information of tomographic images by irradiating thereon said modulated writing light beam emanating from said modulating means and an erasing light source for projecting an erasing light beam onto said Pockels readout optical modulator;

a second light source for emitting a second coherent light beam;

a beam splitting means for splitting said second coherent light beam emitted by said second light source into a reference light beam and a coherent reading light beam;

a second optical means for irradiating said coherent reading light beam onto said Pockels readout optical modulator to readout the pictorial information stored in said Pockels readout optical modulator and introducing the coherent reading light beam transmitted through said Pockels readout optical modulator to one of a plurality of photographic planes related to said plurality of sectional planes;

a third optical means for introducing said reference light beam to said one of a plurality of photographic planes to form interference fringes between said reference light beam and coherent reading light beam;

a photographic plate which is positioned in said one of a plurality of predetermined photographic planes and is exposed by said interference fringes; and a driving means for positioning said photographic plates at said predetermined photographic planes in succession.

In a preferable embodiment of the three-dimensional image displaying apparatus according to the invention, the modulating means comprises a series arrangement of an intensity modulator for modulating an intensity of said first coherent light beam in accordance with the intensities of respective pixels of tomographic image and a two-dimensional deflector for deflecting the first coherent light beam emanating from the intensity modulator in accordance with positions of respective pixels of tomographic image.

According to the invention, the pictorial information is stored in the Pockels readout optical modulator by projecting the writing light beam whose intensity and position are modulated in accordance with the pictorial information of tomographic image, so that it is possible to store the pictorial information having very high contrast and resolution in the Pockels readout optical modulator. Therefore, it is possible to reproduce the three-dimensional image having very high contrast and resolution.

DESCRIPTION OF THE PREFERRED EMBODIMENTS

Figure 1:
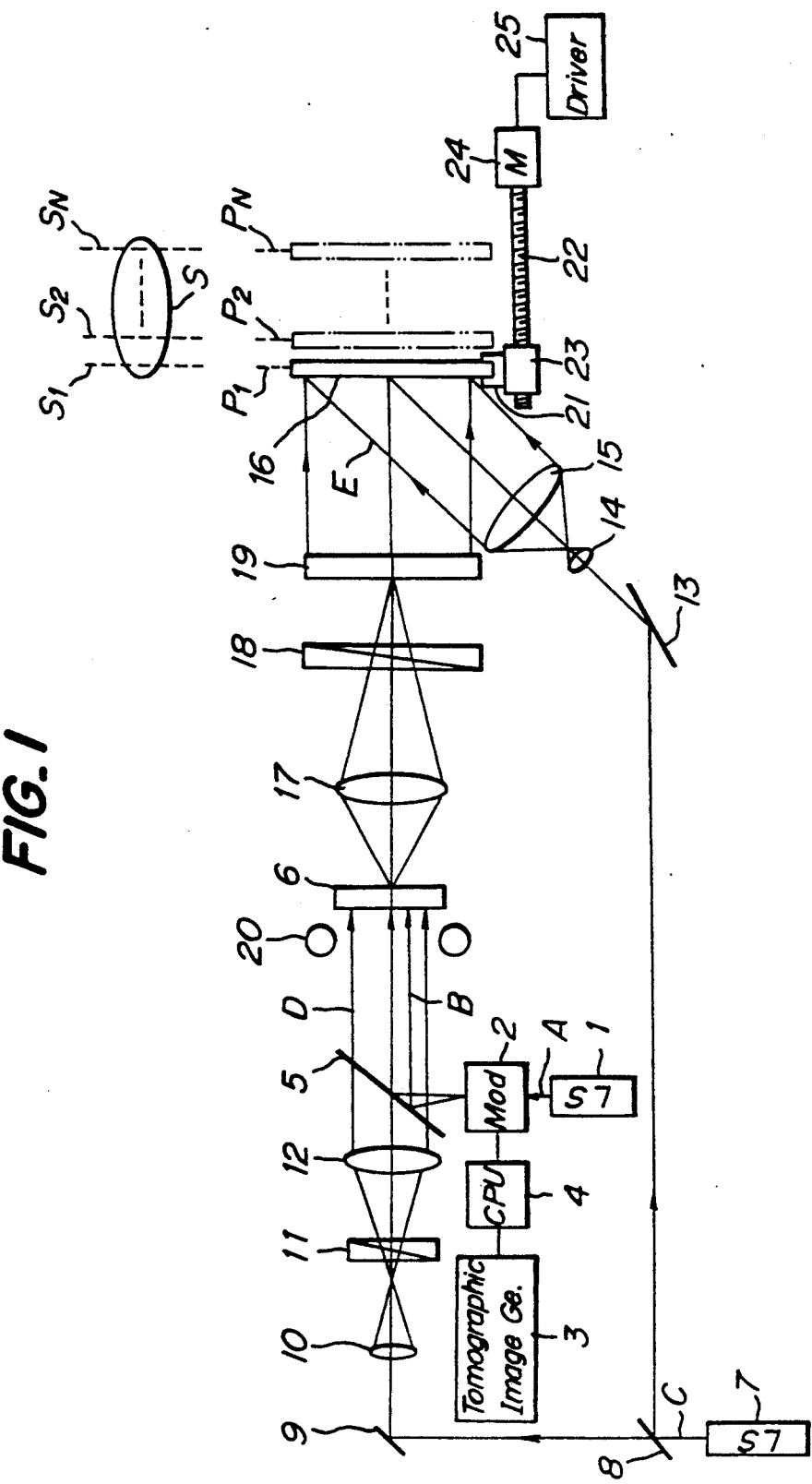
FIG. 1 is a schematic view showing the construction of an embodiment of the three-dimensional image displaying apparatus according to the invention.

FIG. 1 is a schematic view showing the construction of an embodiment of the three-dimensional image displaying apparatus according to the invention. The apparatus comprises a first light source (LS) 1 which emits a first coherent light beam A having a constant intensity. The first light source 1 may be formed by an Ar ion laser emitting a coherent light beam having a wavelength of 0.488 $\mu$m. This first coherent light beam A is made incident upon a modulator 2. There is further provided a tomographic image generating device 3 such as X-ray CT device, $^1$H NMR, positron CT device and ultrasonic tomographic device. Objects under inspection may be living bodies, metals, ceramics, synthetic resins and others. The tomographic image generating device 3 can produce pictorial data which represents a plurality of tomographic images of the object under inspection which are taken in predetermined different sectional planes $S_1$, $S_2$—$S_N$. The tomographic image generating device supplies pictorial data of a tomographic image to a central processing unit (CPU) 4. The CPU 4 processes the tomographic image data supplied from the tomographic image generating device 3 in accordance with a given algorithm and produces pictorial information of tomographic image which represents a modulation signal for modulating the intensity and position of the first coherent light beam A.

Figures 2, 3:
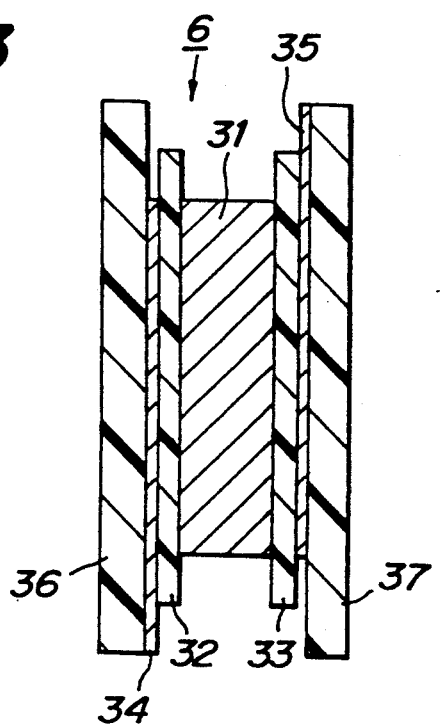
FIG. 2 is a schematic view showing the modulating signal.
FIG. 3 is a cross sectional view of the Pockels readout optical modulator used in the apparatus illustrated in FIG. 1.

FIG. 2 is a schematic view depicting the modulation signal supplied from CPU 4 to the modulator 2. The tomographic image is composed of n×m pixels and positions of each pixels are denoted by X and Y addresses, and intensities of each pixels are represented by $I_{11}$, $I_{21}$—$I_{n1}$; $I_{12}$, $I_{22}$—$I_{n2}$—; —; $I_{1m}$, $I_{2m}$—$I_{nm}$. For instance, a modulation signal for the first pixel is denoted by ($I_{11}$; $x_1,y_1$) in which $I_{11}$ forms an intensity modulating signal and $x_1$, $y_1$ constitutes a position modulating signal.

The modulation signal is supplied to the modulator 2 on which the first coherent light beam A is made incident, and the intensity of the first coherent light beam A is modulated in accordance with the intensity modulating signal and at the same time a position of the first coherent light beam is modulated in accordance with the position modulating signal. In this manner, the first light beam is deflected by the modulator 2 in accordance with positions of respective pixels of the tomographic image while its intensity is modulated in accordance with the intensities of related pixels. To this end, the modulator 2 may be formed by a series arrangement of an intensity modulator for modulating the first coherent light beam and a two-dimensional deflector for deflecting the light beam whose intensity is modulated. In the present embodiment both the intensity modulator and deflector are formed by acoustic-optical elements. According to the invention, the deflector may be constructed by a first deflecting device formed by a galvanomirror and a second deflecting device formed by acoustic-optical element, polygon mirror or galvanomirror.

Then, the first coherent light beam thus modulated is reflected by a beam splitter 5 and is made incident upon a Pockels readout optical modulator (PROM) 6 as a coherent writing light beam B. Since the coherent writing light beam B is deflected in a two-dimensional manner by the modulator 2, a whole surface of PROM 6 is scanned by this light beam B. At the same time, the intensity of the coherent writing light beam B is modulated in accordance with the intensities of pixels of the tomographic image, so that the pictorial information of the tomographic image is written on PROM 6.

There is further provided a second light source for emitting a second coherent light beam C. The second light source 7 may be formed by He-Ne gas laser which emits a coherent light beam having a wavelength of 0.633 $\mu$m. This second coherent light beam C is divided by a beam splitter 8 and a coherent light beam transmitted through the beam splitter 8 is reflected by a mirror 9 and is transmitted through a relay lens 10 and a polarizer 11. Then, the coherent light beam is converted into a parallel light beam by a collimator lens 12, and the parallel light beam emanating from the collimator lens is made incident upon PROM 6 as a coherent reading light beam D.

When the information of tomographic image stored in PROM 6 is read out, the coherent reading light beam D is made incident upon PROM 6. PROM 6 has stored therein the pictorial information of the tomographic image as the electric field distribution and the intensity of the reading light beam is modulated by the electro-optical effect due to the electric field in PROM 6. A light beam emanating from PROM 6 is made incident upon a photographic plate 16 by means of objective lens 17, analyzer 18 whose polarizing direction is perpendicular to that of the polarizer 11, and diffusion plate 19. At the same time, a coherent light beam reflected by the beam splitter 8 is made incident upon the photographic plate 16 by means of reflection mirror 13, relay lens 14 and collimator lens 15 as a parallel coherent reference light beam E, so that there are formed fringes due to interference between the coherent reading light beam D and the coherent reference light beam E. The photographic plate 16 is positioned in a first photographic plane $P_1$ which is related to the first sectional plane $S_1$. The photographic plate 16 is exposed by the interference fringes. In this manner, the interference fringes are recorded on the photographic plate 16.

After the above operation is completed for the first tomographic image, the information stored in PROM 6 is erased by irradiating an erasing light beam emitted from an erasing light source 20 which is formed by a ring-shaped fluorescent lamp and new pictorial information of a second tomographic image is written on PROM 6 by modulating the first coherent light beam A in accordance with the pictorial data of the second tomographic image produced by the tomographic image generating device 3. It should be noted that a second sectional plane $S_2$ of the second tomographic image is slightly different from the first sectional plane $S_1$ of the first tomographic image, and the photographic plate 16 is shifted to a second photographic plane $P_2$ which is related to the second sectional plane $S_2$ and is slightly further from PROM 6 than the first photographic plane $P_1$. To this end, the photographic plate 16 is placed on a holder 21 and the holder is moved by a sliding device including a lead screw 22, a nut 23 which is secured to the holder 21, and a motor 24 for rotating the lead screw 22. By energizing the motor 24 in a given direction by a driving circuit 25, it is possible to move the holder 21 (i.e., photographic plate 16 in a direction parallel to an optical axis along which the reading light beam is made incident upon the photographic plate 16). In this manner, the photographic plate 16 may be indexed at successive photographic planes $P_1$, $P_2$—$P_N$.

After the photographic plate 16 has been indexed in the second photographic plane $P_2$, an image of fringes formed by the interference between the reference light beam and the reading light beam emanating from the Pockels readout optical modulator 6 and modulated by the pictorial information of the second tomographic image is recorded on the photographic plate 16.

In this manner, images of interference fringes having the pictorial information of successive tomographic images are recorded on the photographic plate 16 in a superimposed manner, while the photographic plate is successively positioned in the photographic planes $P_1$, $P_2$—$P_N$ by controlling the driving circuit 25 of the motor 24. After all tomographic images have been treated in the manner explained above, the photographic plate 16 is developed in a usual manner to form a hologram of the superimposed tomographic images. A three-dimensional image of the object can be reproduced by projecting the reference light beam E onto the hologram.

In PROM 6, the light intensity information of the tomographic image to be written is converted into the distribution of the electric field within an electro-optical single crystal of the Pockels readout optical modulator 6 due to the photoconductivity effect of the electro-optical single crystal and the thus converted electric field distribution is stored. In case of reading the information out of PROM 6, the intensity of the reading light beam is modulated in accordance with the electro-optical effect due to the distribution of the electric field.

As explained above, in the three-dimensional image displaying apparatus according to the invention, it is possible to record a very clear three-dimensional image on the photographic plate and therefore, it is possible to reproduce a very clear three-dimensional image of the object. In order to certify the function of the present invention, the inventors constructed an apparatus in which the tomographic images are formed on CRT screen and are projected onto PROM. In this case, the luminous intensity, contrast and resolution of images displayed on CRT were low, so that a clear three-dimensional image could not be reproduced. According to the invention, the tomographic images are projected upon PROM 6 by means of the above explained projection type image forming device, it is possible to reproduce a very clear three-dimensional image having very high resolution and contrast.

FIG. 3 is a cross sectional view illustrating the construction of the Pockels readout optical modulator 6. PROM 6 comprises an electro-optical single crystal plate 31, insulating films 32 and 33 applied on opposite surfaces of the crystal plate 31, transparent electrodes 34 and 35 applied on surfaces of the insulating films 32 and 33, respectively, and transparent substrates 36 and 37 between which said crystal plate 31, insulating films 32, 33 and transparent electrodes 34 and 35 are inserted.

In the present embodiment, the electro-optical single crystal plate 31 is advantageously formed by a single crystal plate of $Bi_{12}Si_{20}O$ (BSO). Heretofore, the insulating films 32 and 33 were made of parylene or cleavage plate of mica, but in the present embodiment, the insulating films 32 and 33 are advantageously made by a thin glass film such as Pyrex glass (trade mark) film which has a high hardness and high breakdown voltage. Then the resolution of the three-dimensional image can be further improved.

In PROM for use in the apparatus according to the invention in which the readout is performed by using the coherent light beam, in order to avoid the generation of undesired interference fringes due to multiple reflection light rays within the electro-optical crystal, it is preferable to taper the major surfaces of the electro-optical crystal. A taper angle is determined depending upon the element and apparatus, and advantageously may be set to about 15 minutes.

Further, by utilizing the incoherent-to-coherent conversion faculty of PROM, the enhancement of image edges and the removal of noise could be performed, if desired.

In the above embodiment, the erasing light source is formed by the ring-shaped fluorescent lamp, but it may be formed by an incandescent lamp such as halogen lamp. In this case, it is preferable to arrange PROM in a flat casing which has reflective inner walls and the light emitted by the halogen lamp is made incident upon the flat casing through its end face.

As explained above, according to the invention, when the pictorial information of tomographic images is recorded on PROM, the intensity of the coherent writing light beam and the position on PROM upon which the writing light beam is made incident are modulated in accordance with the pictorial information of tomographic images, so that the pictorial information of the tomographic images having very high resolution and contrast can be stored in PROM. Therefore, it is possible to reproduce the three-dimensional image having very high resolution and contrast.

What is claimed is:

1. An apparatus for displaying a three-dimensional image of tomographic images comprising:
   a tomographic image producing means for producing pictorial information representing tomographic images of an object under inspection, said tomographic images being taken on a plurality of predetermined sectional planes of the object;
   a first light source for emitting a first coherent light beam;
   a modulating means for modulating an intensity and a position of said first coherent light beam in accordance with said pictorial information of tomographic images to produce a coherent writing light beam whose intensity and position are modulated in accordance with said pictorial information of tomographic images;

a first optical means for introducing said coherent writing light beam to an image storing plane;

an image information storing means including a Pockels readout optical modulator which is arranged in said image storing plane for storing therein said pictorial information of tomographic images by having said modulated writing light beam emanating from said modulating means irradiated thereon;

an erasing light source for projecting an erasing light beam onto said Pockels readout optical modulator;

a second light source for emitting a second coherent light beam;

a beam splitting means for splitting said second coherent light beam emitted by said second light source into a reference light beam and a coherent reading light beam;

a second optical means for irradiating said coherent reading light beam onto said Pockels readout optical modulator to readout the pictorial information stored in said Pockels readout optical modulator and for introducing the coherent reading light beam transmitted through said Pockels readout optical modulator to one of a plurality of predetermined photographic planes related to said plurality of sectional planes;

a third optical means for introducing said reference light beam to said one of a plurality of photographic planes to form interference fringes between said reference light beam and coherent reading light beam;

a photographic plate which is positioned in said one of a plurality of predetermined photographic planes and is exposed by said interference fringes; and a driving means for positioning said photographic plate at said plurality of predetermined photographic planes in succession.

2. An apparatus according to claim 1, wherein said tomographic image producing means comprises a tomographic image generating device for producing pictorial data of a tomographic image and a central processing unit for processing said pictorial data to produce said pictorial information which represents positions of pixels constituting the tomographic image and intensities of respective pixels.

3. An apparatus according to claim 2, wherein said tomographic image generating device is formed by one of X-ray computer tomographic device, positron computer tomographic device, ultrasonic tomographic device and nuclear magnetic resonance device.

4. An apparatus according to claim 2, wherein said modulating means comprises a series arrangement of an intensity modulator for modulating an intensity of said first coherent light beam in accordance with the intensities of respective pixels of tomographic image and a two-dimensional deflector for deflecting the first coherent light beam emanating from said intensity modulator in accordance with positions of respective pixels of tomographic image.

5. An apparatus according to claim 4, wherein each of said intensity modulator and two-dimensional deflector is formed by an electro-acoustic element.

6. An apparatus according to claim 1, wherein said first optical means comprises a half mirror for reflecting the coherent writing light beam emanating from said modulating means, said coherent reading light beam is transmitted through said half mirror and then is made incident upon said Pockels readout optical modulator.

7. An apparatus according to claim 6, wherein said second optical means comprises a first group including a relay lens, a polarizer and a collimator lens for irradiating the coherent reading light beam onto said Pockels readout optical modulator as a polarized parallel light beam, and a second group including an objective lens, an analyzer whose polarizing direction is perpendicular to that of said polarizer and a diffusion plate for irradiating the coherent reading light beam emanating from said Pockels readout optical modulator onto said photographic plate.

8. An apparatus according to claim 7, wherein said third optical means comprises a reflecting mirror, a relay lens and a collimator lens for projecting said reference light beam onto said photographic plate as a parallel light beam.

9. An apparatus according to claim 1, wherein said driving means comprises a holder for supporting said photographic plate, a sliding device for moving said holder in a direction parallel with an optical axis along which said coherent reading light beam is made incident upon the photographic plate, and a driving circuit for operating said sliding device to index said photographic plate successively in said plurality of photographic planes.

10. An apparatus according to claim 1, wherein said Pockels readout optical modulator comprises an electro-optical single crystal plate, a pair of glass films applied on respective surfaces of the electro-optical single crystal plate, a pair of transparent electrodes applied on respective surfaces of the insulating films, and a pair of transparent substrates between which is inserted an assembly of said electro-optical single crystal plate, glass films and transparent electrodes.

11. An apparatus according to claim 10, wherein said electro-optical single crystal plate is formed by $Bi_{12}Si_{20}O$ and said glass films are made of glass having high hardness and high breakdown voltage.

* * * * *